(12) United States Patent
Megel et al.

(10) Patent No.: US 11,346,614 B2
(45) Date of Patent: May 31, 2022

(54) METHOD FOR CALCULATING GROUND STORAGE DEVICE TEMPERATURES FOR THE OPERATION OF A GEOTHERMAL FACILITY

(71) Applicant: Foxmark AG, Niederteufen (CH)

(72) Inventors: Thomas Megel, Zurich (CH); Remo Bremgartner, Gais (CH); Dimitrios Gyalistras, Bern (CH)

(73) Assignee: Foxmark AG, Niederteufen (CH)

( * ) Notice: Subject to any disclaimer, the term of this patent is extended or adjusted under 35 U.S.C. 154(b) by 480 days.

(21) Appl. No.: 16/341,996

(22) PCT Filed: Oct. 19, 2017

(86) PCT No.: PCT/EP2017/076693
§ 371 (c)(1),
(2) Date: Apr. 15, 2019

(87) PCT Pub. No.: WO2018/073337
PCT Pub. Date: Apr. 26, 2018

(65) Prior Publication Data
US 2019/0249931 A1 Aug. 15, 2019

(30) Foreign Application Priority Data
Oct. 19, 2016 (DE) .................... 10 2016 119 926.5

(51) Int. Cl.
*F28D 20/00* (2006.01)
*F24T 10/00* (2018.01)

(52) U.S. Cl.
CPC .......... *F28D 20/0052* (2013.01); *F24T 10/00* (2018.05); *F24T 2010/56* (2018.05);
(Continued)

(58) Field of Classification Search
CPC ... F28D 20/0052; F24T 10/00; F24T 2010/56; F24T 2201/00; Y02E 10/10; Y02E 60/14; Y02E 70/30
(Continued)

(56) References Cited

U.S. PATENT DOCUMENTS

2007/0061104 A1 3/2007 Nagano
2016/0195288 A1* 7/2016 Hamstra .................. F24F 11/70
700/276

FOREIGN PATENT DOCUMENTS

DE 2916530 A1 10/1979
DE 102012013337 A1 1/2014

OTHER PUBLICATIONS

Fujimitsu, Evaluation of subsurface thermal environmental change caused by a ground-coupled heat pump system, Nov. 11, 2009, Current Applied Physics, pp. 113-116 (Year: 2009).*

(Continued)

*Primary Examiner* — Tho V Duong
*Assistant Examiner* — Raheena R Malik
(74) *Attorney, Agent, or Firm* — Patent Central LLC; Stephan A. Pendorf (57) ABSTRACT

A method for calculating ground storage device temperatures for operating a geothermal facility with a circulation system by means of at least one geothermal heat exchanger or an energy pile with inflow and outflow lines leading to the geothermal heat exchanger or energy pile. The underground temperature in the ground storage device and/or the temperatures on the inflow and outflow lines are measured. The method includes the following steps: designing a ground storage device model (2) for converting the measured temperature variations into dynamic energy flows in the ground storage device; designing an energy flow model (3) based on statistically determined models and influencing variables relating to heat and cold; and calculating the future tem-
(Continued)

perature variations (5) in the ground storage device using the energy flow model (3) and the ground storage device model (2).

8 Claims, 7 Drawing Sheets

(52) U.S. Cl.
CPC ........... *F24T 2201/00* (2018.05); *Y02E 10/10* (2013.01); *Y02E 60/14* (2013.01); *Y02E 70/30* (2013.01)

(58) Field of Classification Search
USPC .......................................................... 165/45
See application file for complete search history.

(56) References Cited

OTHER PUBLICATIONS

International Search Report dated Jan. 15, 2018, in International Application No. PCT/EP2017/076693.
Fujimitsu Y et al: "Evaluation of subsurface thermal environmental change caused by a ground-coupled heat pump system", Current Applied Physics, North-Holland, Amsterdam, NL, vol. 10, No. 2, Mar. 1, 2010 (Mar. 1, 2010), pp. S113-S116, XP026984043, ISSN: 1567-1739, [retrieved on Nov. 11, 2009], the whole document.
Zhou Zhihua et al: "Temperature change of underground in the long running of vertical ground-coupled heat pump", Electric Technology and Civil Engineering (ICETCE), 2011 International Conference ON, IEEE, Apr. 22, 2011 (Apr. 22, 2011), pp. 1643-1646, XP031872745, DOI: 10.1109/ICETCE.2011.5775915, ISBN: 978-1-4577-0289-1, the whole document.
Hwang S et al: "Evaluation of estimation method of ground properties for the ground source heat pump system", Renewable Energy, Pergamon Press, Oxford, GB, vol. 35, No. 9, Sep. 1, 2010 (Sep. 1, 2010), pp. 2123-2130, XP027015031, ISSN: 0960-1481, [retrieved on Feb. 26, 2010], the whole document.
Ozgener Onder et al: "A practical approach to predict soil temperature variations for geothermal (ground) heat exchangers applications", International Journal of Heat and Mass Transfer, Pergamon Press, GB, vol. 62, Apr. 9, 2013 (Apr. 9, 2013), pp. 473-480, XP028590904, ISSN: 0017-9310, DOI: 10.1016/J.IJHEATMASSTRANSFER.2013.03.031, the whole document.
Garcia-Valladares 0 et al: "Numerical modeling of flow processes inside geothermal wells: An approach for predicting production characteristics with uncertainties", Energy Conversion and Management, Elsevier Science Publishers, Oxford, GB, vol. 47, No. 11-12, Jul. 1, 2006 (Jul. 1, 2006), pp. 1621-1643, XP027957270, ISSN: 0196-8904, [retrieved on Jul. 1, 2006], the whole document.

\* cited by examiner

METHOD FOR CALCULATING GROUND STORAGE DEVICE TEMPERATURES FOR THE OPERATION OF A GEOTHERMAL FACILITY

The invention relates to a method for calculating ground storage device temperatures for operating a geothermal facility with a circulation system by means of at least one geothermal heat exchanger or an energy pile with inflow and outflow lines leading to the geothermal heat exchanger or energy pile, wherein the underground temperature in the ground storage device and/or the temperatures at the inflow and outflow lines are measured. As an alternative to the temperatures, an energy flow at the inlet and outlet lines can also be measured.

In borehole heat exchangers or energy pile facilities for home heating and/or building air conditioning, it is known to measure the temperature at the circulation system especially at the inlet and outlet pipes. Alternatively, or additionally, geothermal systems can also have a temperature sensor in or on the geothermal heat exchanger/energy pile in the ground, so that the background temperature is monitored in the area of the ground storage device. Therewith the current measured values of the directly or indirectly measured ground storage tank temperature can be used to control and regulate the geothermal facility. Alternatively, the energy flow can be measured and used to control the geothermal system. The disadvantage is that an energetic energy management of the ground storage device does not take place. To be clear, the definition of geothermal facilities always includes both facilities with geothermal heat exchangers as well as with energy piles. Although in the following text only geothermal heat exchangers are mentioned, this term is used as a synonym and should also include the alternative with an energy pile system.

A heat storage and recuperator arrangement is known from the DE 26 51 684 A1, in which heat is stored in a rock matrix as a trapped layer and retrieved. For this purpose, water is circulated over this rock matrix into a primary circuit which is heated or cooled by a heat exchanger via a secondary circuit. Thus, heat from a distribution network is temporarily stored in this rock matrix and retrieved when needed. The arrangement also includes measuring devices for forward-reverse counting of the circulated water volume, pressure sensor and temperature sensor, and a flow rate-actuator, wherein the provision or the requisitioning of heat is controlled via a heating up- and use-secondary circuit.

DE 29 16 530 A1 discloses a method and apparatus for production and distribution of thermal energy with compensated transfers in geothermal layers. Therein a thermal exchange circuit with heat distribution and recovery circuits and a geothermal layer are managed such that in the course of an annual cycle the heat distribution circuit of the geothermal layer extracts a quantity of heat, which causes a reduction of the layer temperature, and in the further course of the annual cycle again returns about the same amount of heat to this layer via heat recovery circuit feeds. A long-term prognosis of the expected ground storage temperatures can not be given with this method either. Rather, a required amount of heat is supplied to the geothermal layer through the heat recovery circuit by an active control.

In addition, so-called geothermal heat exchangers are known as closed circulation systems for the geothermal use of temperature levels in the underground. In part, such closed systems are also integrated in so-called energy piles for geothermal use. As an example, see DE 10 2012 013 337 A1.

Even with closed circulation systems using geothermal heat exchangers there are risks in energy management. If the energy use of the underground storage system deviates significantly from the planning values and/or assumptions about the thermal properties of the subsoil prove to be faulty, this can lead to a shutdown of the heating or cooling supply during further operation of the geothermal system. This tends to happen during times with the largest heat or refrigeration demand since this is when the geothermal system carries the greatest load. Mostly this thermal event is not predicted or predictable during planning, and leads to operational disruption only after years of economically viable operation of the geothermal system. As a result, emergency solutions or facility adjustments must be made under time pressure, which often no longer fall within the warranty period of the facility manufacturer.

In the planning of geothermal systems, energy balances and consumption scenarios have been used so far, some of which are based on very uncertain assumptions regarding operational management, the regulation used, the local climate, the use of buildings, the influence of neighboring geothermal facilities, etc. Therefore, it is likely that the effective use of the ground storage and thus its temperature development in the course of the building operation deviates significantly from the planning assumptions.

The object of the invention is therefore to be able to provide a long-term forecast of expected ground storage device temperatures for proposed geothermal facilities, which is based on the actual use of the ground storage device.

This object is achieved by the method according to claim 1 or 2. By measurements of the temperature of the ground storage device and/or the brine temperatures (temperature of the circulating medium (brine)) carried out continuously or at a correspondingly suitable sampling rate during operation of the geothermal system, dynamic energy flows in the ground storage can be calculated via a created ground storage model. Alternatively, the energy flow is measured at the circulation system (inlet and outlet lines). Then, from these dynamic energy flow measurements in the underground storage system over a long period of operation, an energy flow model is created in dependence on parameters and input values, such as the season, day of the week, time of day, the operation of the facility, facility use information, air conditioning information, and/or weather information, as well as the load on the ground storage created by neighboring facilities. From the assumed values regarding the future input values and parameters and the energy flow model, the expected dynamic energy flows in the ground storage can be determined. With these expected dynamic energy flows and the ground storage model, the future temperature progressions in the ground storage can be calculated.

During operation of the geothermal system, long-term forecasts can thus be made available on the basis of the previously measured ground storage and/or brine temperatures from the geothermal heat exchanger field. With this evaluation of the temperature measured values, emerging risks, which jeopardize the economic operation of the geothermal facility, can be recognized early and measures for the operational safety can be taken in advance. For example, an active energy management of the ground storage device delays or even prevents excessive cooling of the ground storage device. Thus, the forecasting process can be used for security of investment through timely asset-, operating- or regulatory-adjustments or probabilistic statements on guaranteed solutions. In addition, the process can be used to ensure sustainable thermal use of the subsurface on a municipal or even more extensive scale.

Insofar as the expected values or other statistical key figures (such as the variances, the autocovariances or the skewness) of the dynamic energy flows in the ground storage have a robust dependency on the season, the day of the week, the time of day or other deterministic variables, the inclusion of corresponding cycles, patterns and accidental processes in the energy flow model will ensure that the energy flows and the therefrom resulting temperature progressions in the ground storage device are simulated close to reality.

Since for the creation and parameterization of the energy flow model account must be taken of possible dependencies of the energy flows in the ground storage device on the future operation and use of the system, the outside air temperature and other microclimate and/or weather data, as well as a possible draw from the ground storage device by neighboring facilities, in addition to the operation management and system utilization, there is input into the simulated energy flows and the consequent temperature progressions in the ground storage device external influences by the microclimate, in particular the prevailing outside air temperature, as well as the thermal utilization of the substrate by neighboring facilities.

If the calculated future temperature progressions in the underground storage facility are evaluated in terms of periods when the simulated ground storage tank temperature falls below a lower limit or exceeds an upper limit, critical operating conditions of the geothermal facility can be identified at certain time intervals and their duration and frequency quantified.

For a conventional geothermal facility for heating buildings with geothermal heat exchangers and downstream heat pump, the lower limit for the ground storage device temperature should be 0.0° C. to 4.0° C., preferably 1.5° C.

For a conventional air conditioning of buildings the simulated ground storage device temperature should not exceed the upper limit, in direct cooling the upper limit should be 11.0° C. to 16.0° C., in particular 14° C.

Thereby, that, in the event of an increase in the periods of exceeding the upper limit, an alarm signal is emitted and a stronger cooling of the ground storage is attempted in subsequent operating situations, the critical prognosis of increasingly frequently exceeding of the upper limit is first communicated as an alarm to the users or, as the case may be, the security personnel of the geothermal system, and in future operating situations, which bring about a cooling of the ground storage device, especially when providing heating energy for heating buildings, it is attempted by suitable controls to more strongly cool the ground storage. This is achieved, for example, by activating and/or generating additional heat removal points.

Conversely, in the case of increase of the periods below the lower limit, an alarm signal is emitted and greater warming of the ground storage device is attempted in future operating situations. In this case, attempts are made, for example, in times of cooling the building to perform this cooling more intensively, so that a stronger warming of the ground storage follows from it.

After the appropriate adjustments in the operation and the regulating of the geothermal facility, it can then be checked again for future operating situations, if the adjustments are sufficient to again "align" the ground storage and the entire system, i.e. that the periods exceeding the upper or lower limit value do not continue to increase.

In the following two embodiments of the invention are described in detail with reference to the accompanying drawings.

There is shown in:

FIG. 2 readings of the geothermal brine temperature over a period of more than three months, FIG. 3 calculation of the energy flow from the measured geothermal brine temperature according to FIG. 2 on the basis of a ground storage model, FIG. 4 the parameterization of the energy flow with the outside air temperature, FIG. 5 creation of an energy flow model as a function of the seasonally fluctuating outside air temperatures and expected dynamic energy flows in the ground storage, FIG. 6 calculation of the future temperature progression in the ground storage based on the expected dynamic energy flows in the ground storage and the energy storage model and FIG. 7 calculated future temperature progression on the basis of three different outside temperature scenarios.

Figure 1:
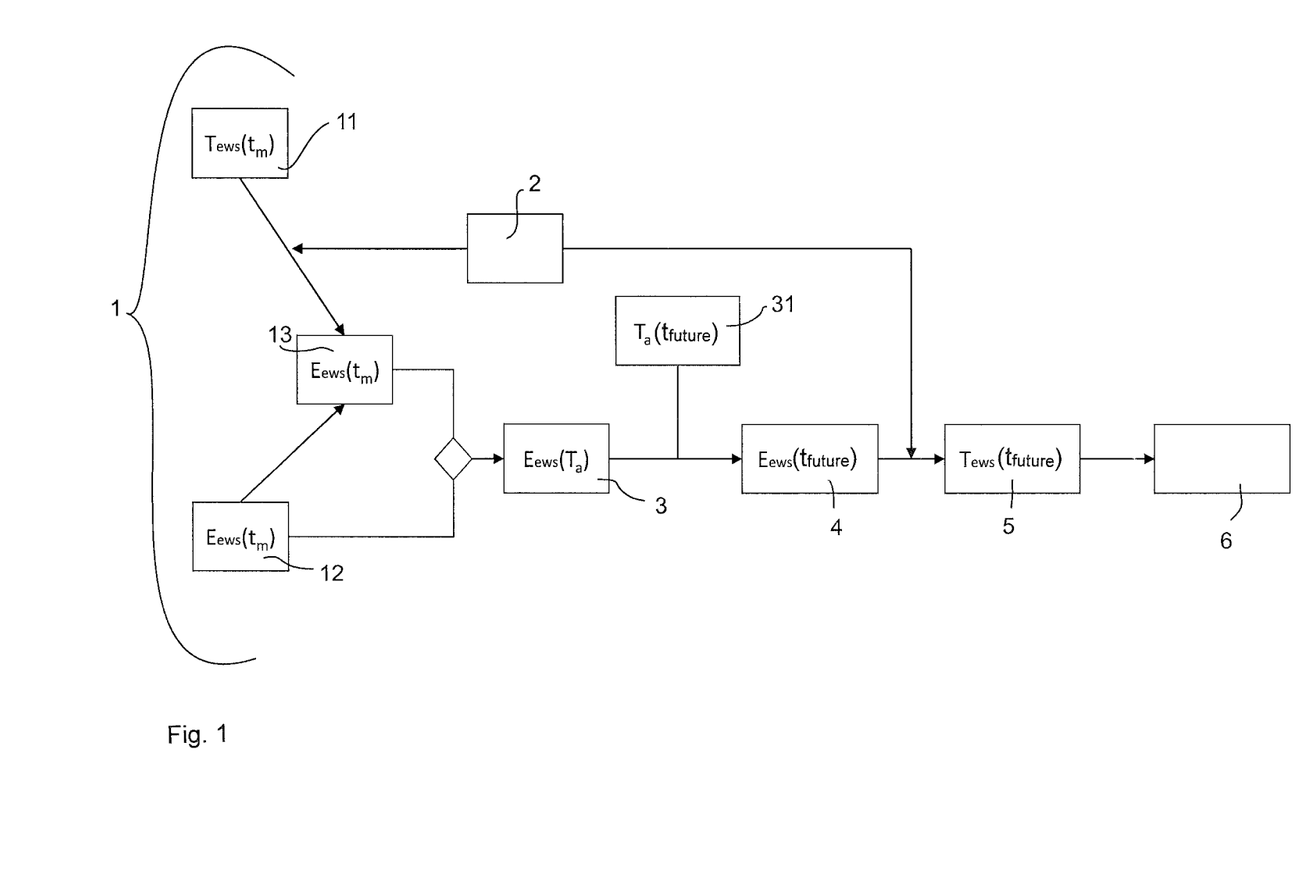
FIG. 1 a schematic flow diagram of the method in two alternatives.

FIG. 1 shows a schematic flow chart of the prediction method. In a survey 1 readings are taken over a period of time $t_m$ (reference 11 or 12).

Figure 2:
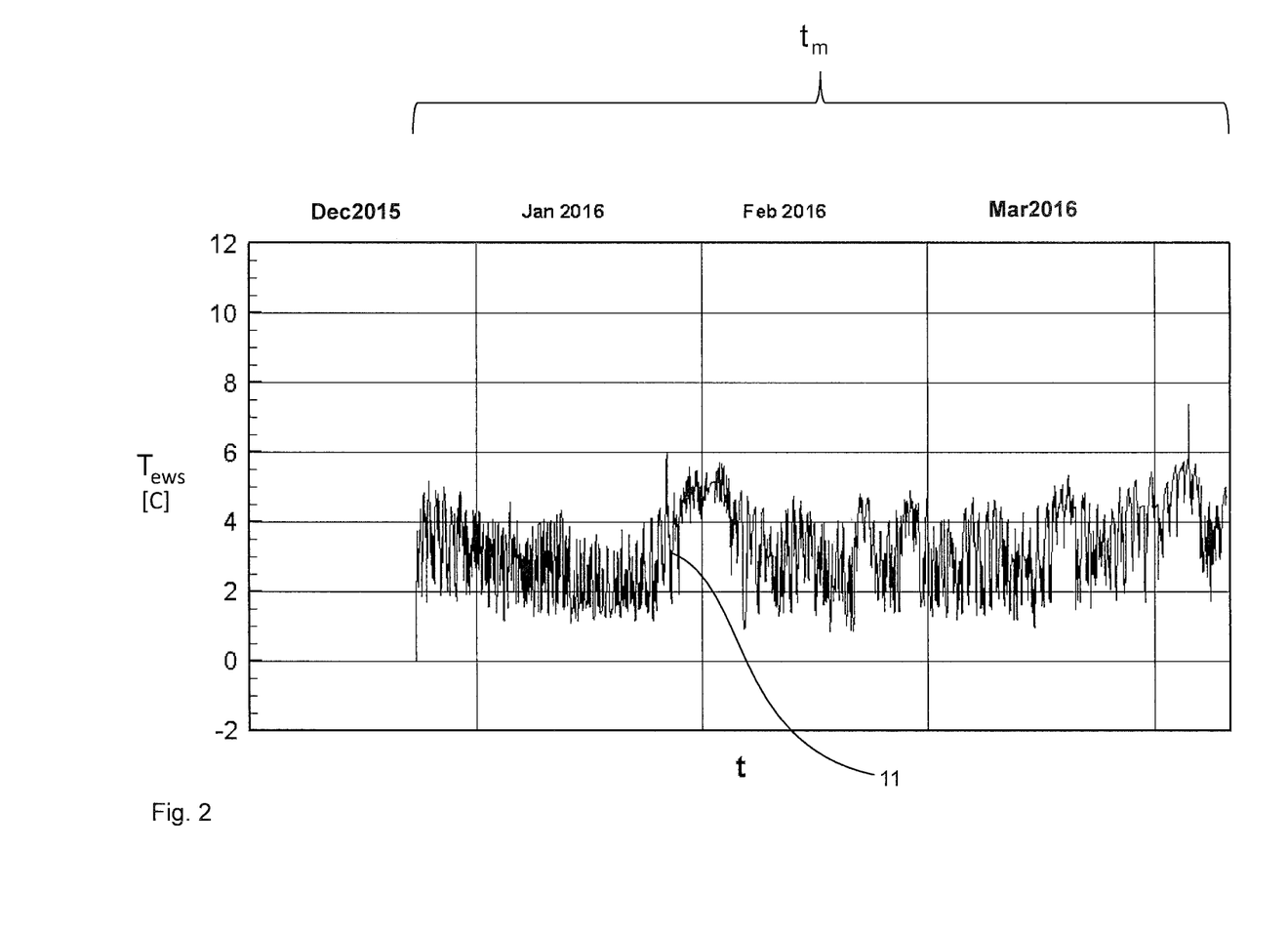

In the preferred embodiment, a temperature measurement 11 takes place at the geothermal heat exchanger or at the (not shown here) inlet/outlet lines for the circulation medium for the geothermal heat exchanger. In the temperature measurement 11 thus $T_{ews}(t_m)$ (FIG. 2) is detected. The temperature measurement 11 can be carried out by a temperature sensor used in the borehole with inserted temperature sensor, a temperature sensor in the geothermal heat exchangers, for example, as a measuring head, or by a temperature measurement at the inlet and outlet pipes of the ground storage device.

A mathematical model of the ground memory is then created and parameterized. Preferably, the ground storage device model takes into account the pure heat conduction processes that occurs along a line source, namely along the geothermal heat exchanger in the bore or in the energy pile, mathematically from the known relationship between a current change in energy and the therefrom resulting temporal temperature change. This relationship can be simulated, for example, using the g-function known from the literature—Eskilson P., 1987; "Thermal analysis of heat extraction boreholes"; Dissertation; Department of Mathematical Physics; Lund University of Technology, Lund, Sweden (see page 10 formula 5.6). Since the heat conduction is described by a linear differential equation, after a sequence of an arbitrary number of energy changes, the therefrom resulting temperature change at a particular time may be calculated by superposition of the individual solutions of the function.

This application is regularly used today in the planning of geothermal heat exchanger or energy pile facilities. The present method newly uses this mathematical procedure in the ground storage device model both for the above-mentioned calculation of the temperature changes from the energy flows in the ground storage device, as well as in the other direction, namely for the calculation of energy flows into the ground storage device from the temperature changes (see FIG. 1, ground storage model 2).

Figure 3:
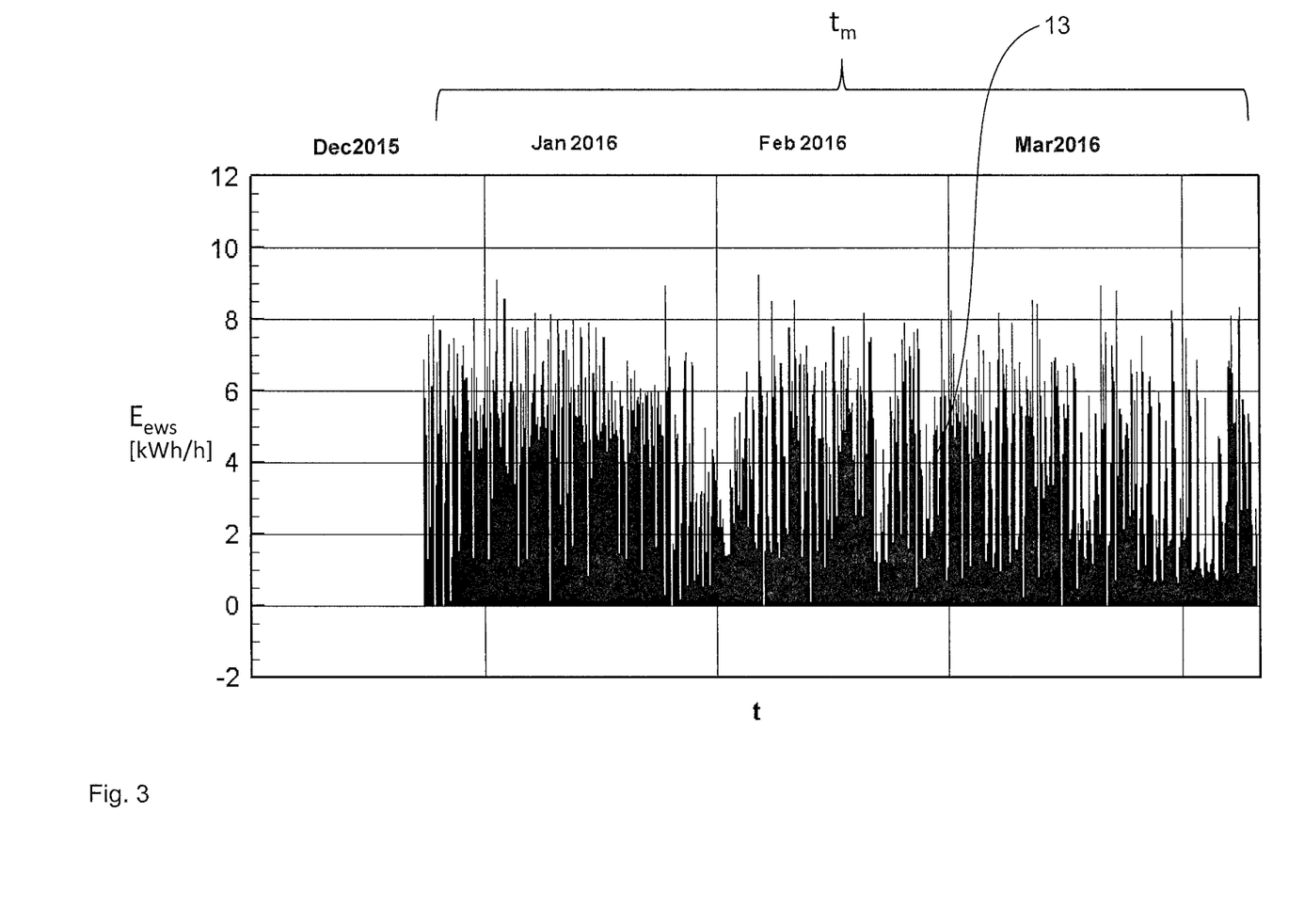

The calculation of the dynamic energy flows in the ground storage device from the measured temperature curves or progressions is carried out by a step-by-step procedure. Here, the instantaneous change of the measured temperature is determined in a certain time step and this is corrected by the temperature effect of all energy flow changes in the previous time steps. Thus, at the end of the current time step only one temperature change remains, which exclusively is the effect of the energy flow change at the beginning of the current time step. Thus, the energy flow change of the current time step can be calculated and the next time step is proceeded to. If the measured temperatures are measured in the circulating brine, the remaining temperature change is corrected in the last calculation step by the heat transfer between the borehole wall and brine. This results in a gapless time series of the energy flows in the ground storage device, which is based on the measured temperature progressions. Thus, this ground storage device model 2 is used for calculating the energy flow $E_{ews}(t_m)$ (FIG. 3, in FIG. 1, derived energy flow 13) via the geothermal heat exchanger from the measured temperatures of the temperature measurement 11. The calculation of future temperature progressions 5 in the ground storage device with the energy flow model 3 is then carried out again with the known procedure described in the first section.

Alternatively to the embodiment with a temperature measurement 11, the measured value acquisition 1 can also be accomplished by energy flow measurement 12 directly on the inlet/outlet line of the geothermal heat exchanger. With the energy flow measurement 12 $E_{ews}(t_m)$ is measured directly. However, an energy flow meter is considerably more expensive than temperature sensors, so that for many applications, the first embodiment with temperature sensors is likely to be more economical. A possible energy flow difference between the energy flow measurement 12 and the energy flow 13, which is derived from the temperature measurement 11, indicates processes not considered in the ground storage model. For example groundwater flows, influence of neighboring facilities etc.

Figure 4:
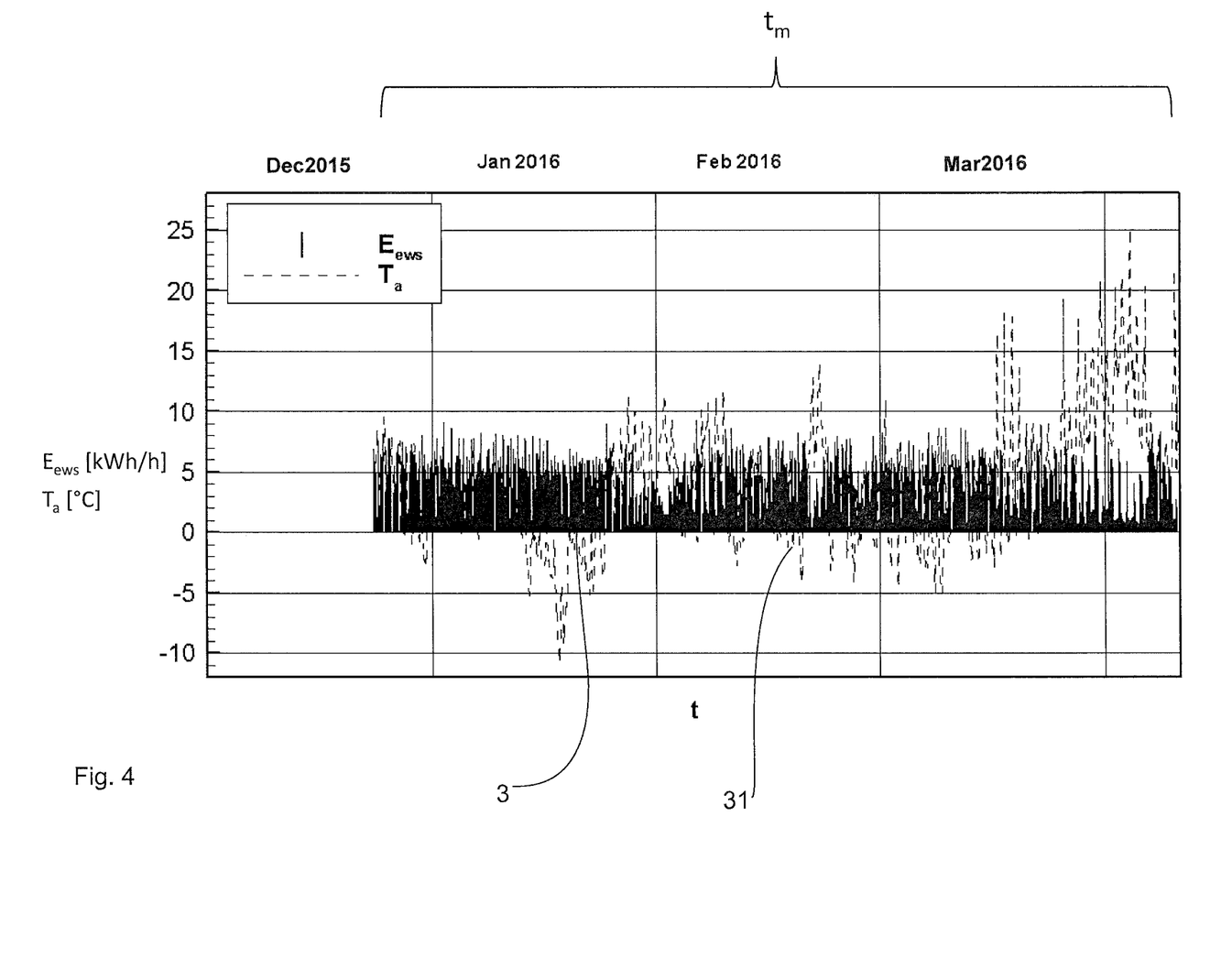

The energy flow calculated from the temperature measurement over the considered time interval $t_m$ or, as the case may be, the measured energy flow from the energy flow measurement 12 is then parameterized with the outside air temperature $T_a$ over the measurement period $t_m$, as shown in the graph in FIG. 4.

Figure 5:
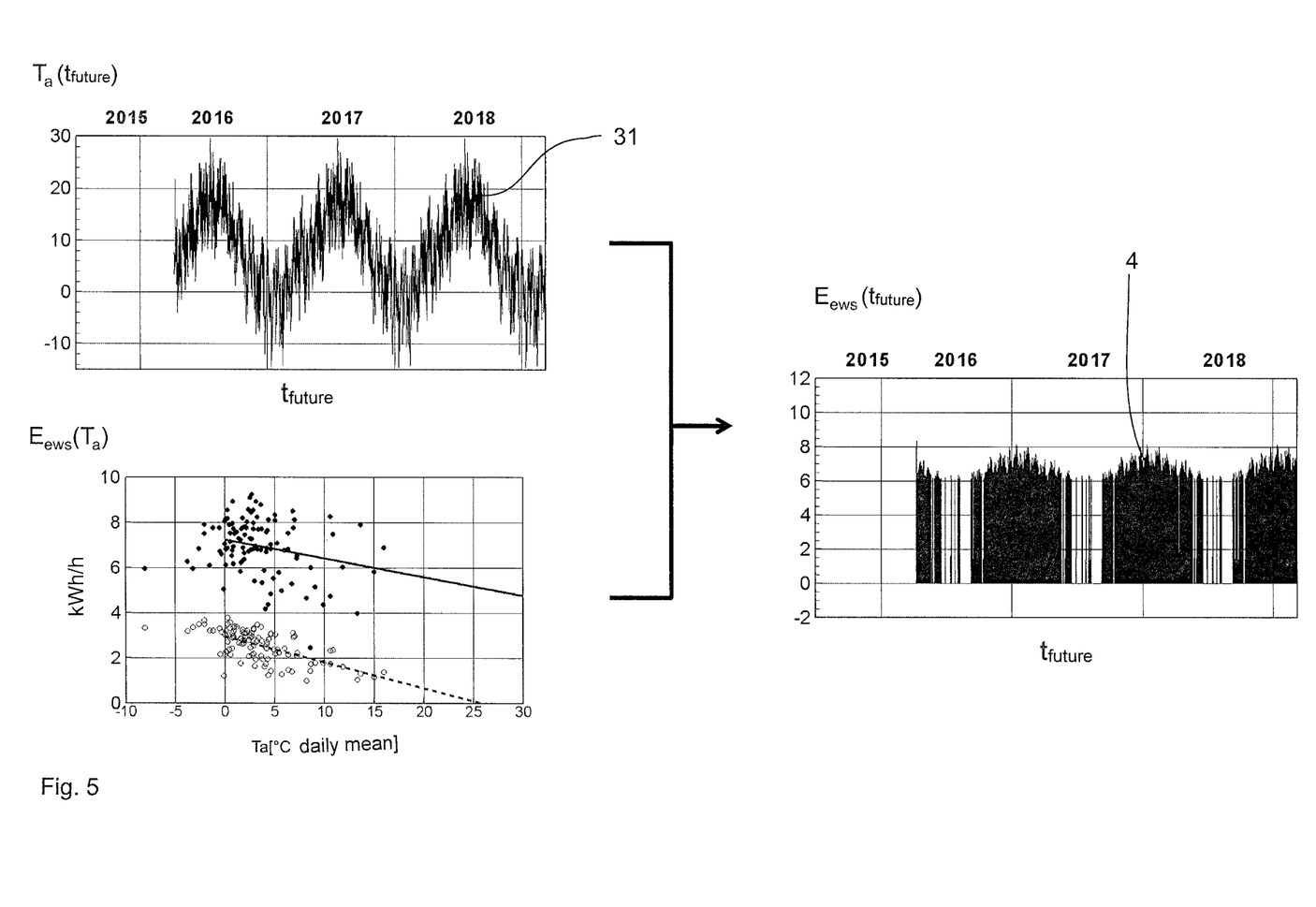

When parameterizing, for example, in relation to the daily averages (open circles in FIG. 5) or daily maximum values (black circles in FIG. 5) of the outdoor temperature $T_a$, an energy flow model $E_{ews}(T_a)$ is derived, which is then used for future scenario determining parameters such as, for example, the future outside air temperature $T_a$ (designated by reference numeral 31 in FIG. 1). From the energy flow model, with the future outside air temperature, energy flow scenarios 4 can then be calculated, i.e. future energy flow values $E_{ews}(t_{future})$ for the geothermal heat exchanger field.

Figure 6:
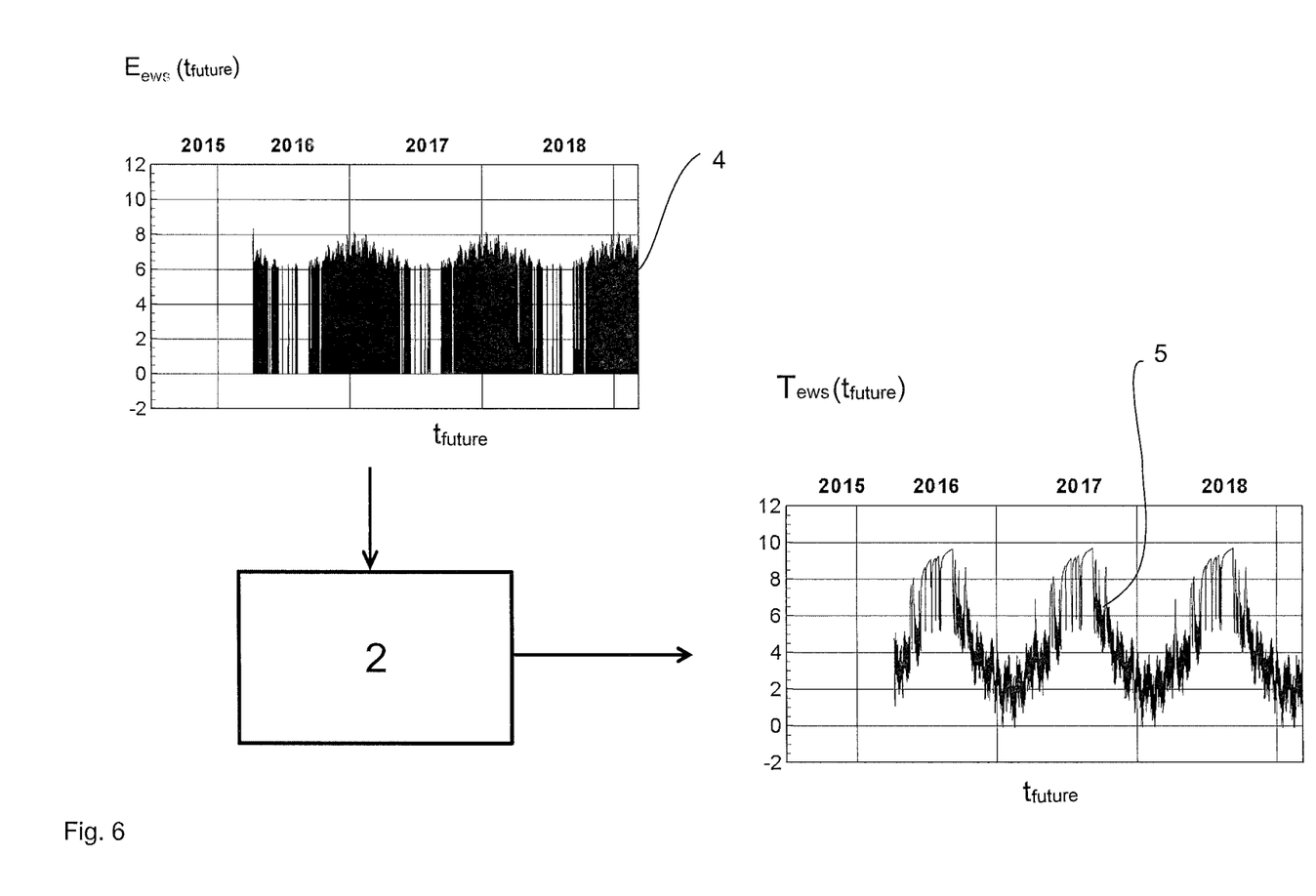
Figure 7:
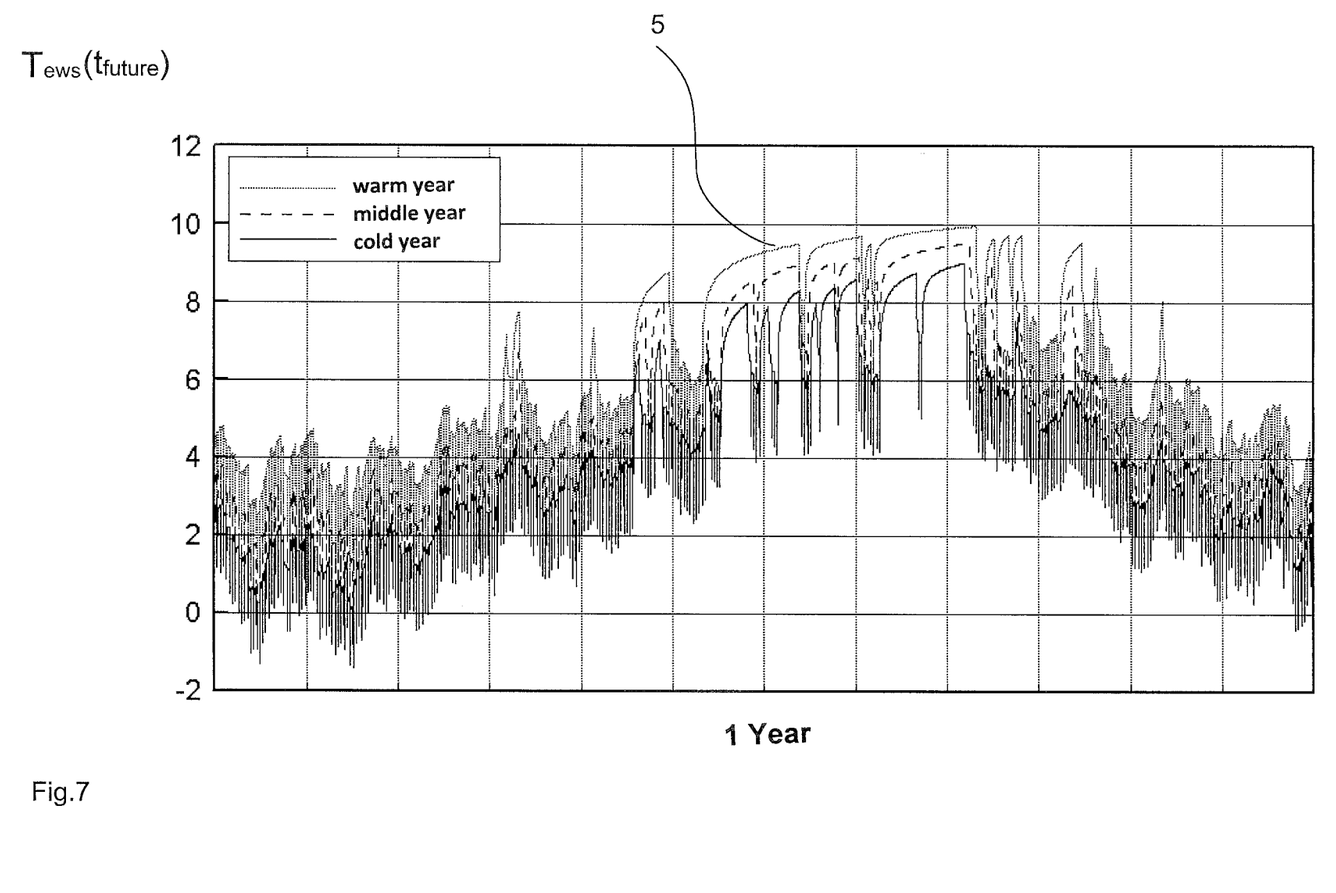

In a further step, which is shown in FIG. 6 with corresponding graphs, the temperature progressions in the ground storage are now calculated based on the energy flow scenarios 4 and the ground storage device model 2, so that as a result, a temperature prediction 5, namely future temperature as a function of time $T_{ews}(t_{future})$ is calculated. By way of example, FIG. 7 shows such a representation for the 25th year, namely in three different variants for warm, normal and cold years. The x-axis shows the time, i.e. for the 25th year, whereas the y-axis shows the predicted temperature of the ground storage.

The future temperature progressions 5 determined in this way can then be supplied to a further evaluation 6 with various possible alerts and controls of the geothermal facility. Limit values can be defined and monitored. If limit values are exceeded, an alarm can then be issued and, if necessary, a countermeasure of the system can occur.

LIST OF REFERENCE NUMBERS

1 measured value acquisition
11 temperature measurement
12 energy flow measurement
13 energy flow, derived
2 ground storage device model
3 energy flow model
31 future outdoor air temperature progression
4 future energy flow
5 future temperature progression, temperature forecast in the ground storage device
6 evaluation and control

The invention claimed is:

1. A method for calculation of underground storage temperatures for the operation of a geothermal facility with a circulation system via at least one geothermal heat exchanger or an energy pile, with inflow and outflow lines leading to the geothermal heat exchanger or energy pile, wherein the underground temperature in the underground storage and/or the temperatures at the inlet and outlet lines are measured to produce temperature profiles, comprising the steps:

designing a ground storage model (2) for converting the measured temperature profiles into dynamic energy flows in the underground storage;

designing an energy flow model (3) based on statistically determined patterns and variables relating to heating and cooling;

and calculating future temperature profiles (5) in the ground storage using the energy flow model (3) and the underground storage model (2), wherein the calculation of the dynamic energy flows in the underground storage from the measured temperature profiles takes place by a step-by-step procedure, wherein in a specific time segment the actual change in the measured temperature is determined and this is corrected by the temperature effect of all energy flow changes in preceding time steps, whereby at the end of the current time step there remains only a temperature change which is solely an effect of the energy flow change at the start of the current time step, whereby the energy flow change of the present time step is calculated prior to advancement to the next time step, whereby there arises a time series, based on the measured temperature profiles, of the energy flows in the underground storage, wherein recurring cyclic patterns of energy flows in the underground storage are taken into account for creation and parameterization of the energy flow model (3) and the energy flows to be expected in the future are simulated using the energy flow model (3) and expected future input quantities and parameter values for operative management and utilization of the plant, the outside air temperature and further microclimate data and/or weather data as well as any influence on the underground storage by neighboring plants.

2. The method according to claim 1, wherein the circulating system comprises brine circulating in boreholes, wherein measured temperatures are measured in the circulating brine and wherein during correction of the current change in the measured temperature, the remaining temperature change is corrected for the heat transfer between borehole wall and brine circulating in the circulation system.

3. The method according to claim 1 wherein the recurring patterns for the creation and parameterization of the energy flow model (3) are annual, weekly and daily cycles of energy flows in the ground storage.

4. The method according to claim 1, wherein the calculated future temperature profiles (31, 5) in the ground storage are evaluated in terms of time periods in which the simulated ground storage temperature falls below a lower limit or exceeds an upper limit.

5. The method according to claim 4, herein the lower limit for the ground storage temperature is 0.0° C. to 4.0° C.

6. The method according to claim 4, wherein the upper limit in the case of direct cooling is 11.0° C. to 16.0° C.

7. The method according to claim 4, wherein in the case of increase of time periods when the upper limit value is exceeded, an alarm signal is emitted and a greater cooling of the ground storage is attempted in future operating situations.

8. The method according to claim 4, wherein as the periods increase below the lower limit, an alarm signal is emitted and a stronger warming of the ground storage is attempted in future operating situations.

* * * * *